April 17, 1928.  1,666,145
W. P. REAVES
REFLECTING AND REFRACTING DEVICE FOR STEREOSCOPES
Filed Aug. 29, 1923    2 Sheets-Sheet 1
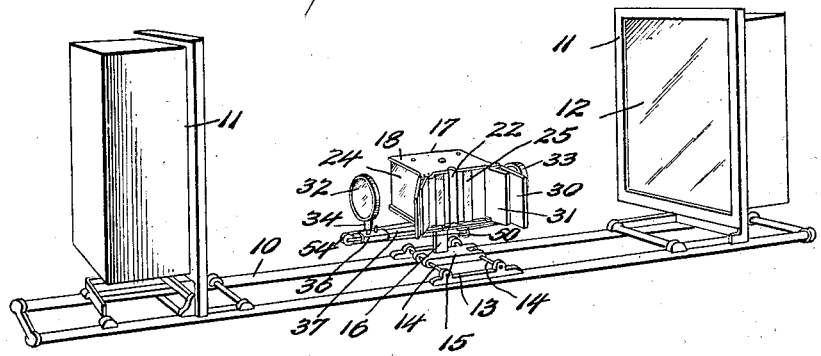

April 17, 1928.
W. P. REAVES
REFLECTING AND REFRACTING DEVICE FOR STEREOSCOPES
Filed Aug. 29, 1923
2 Sheets-Sheet 2
1,666,145
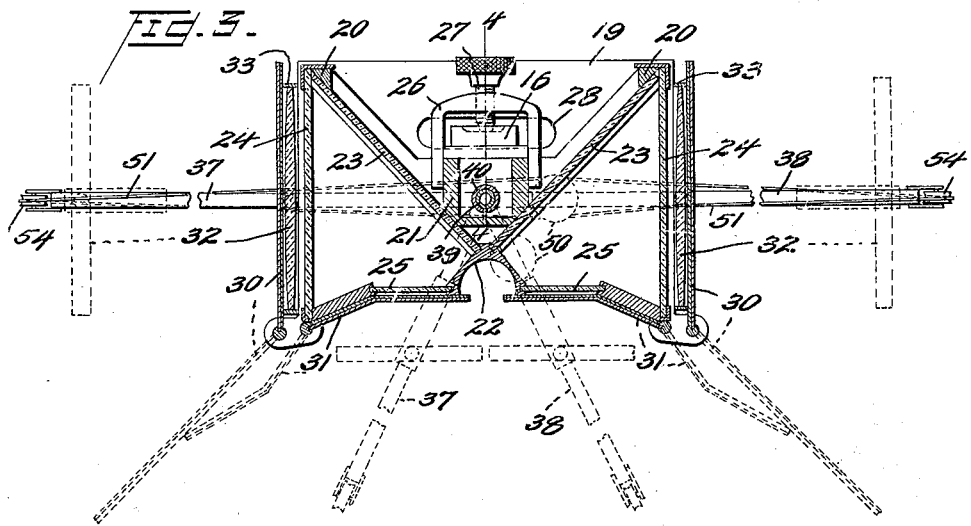
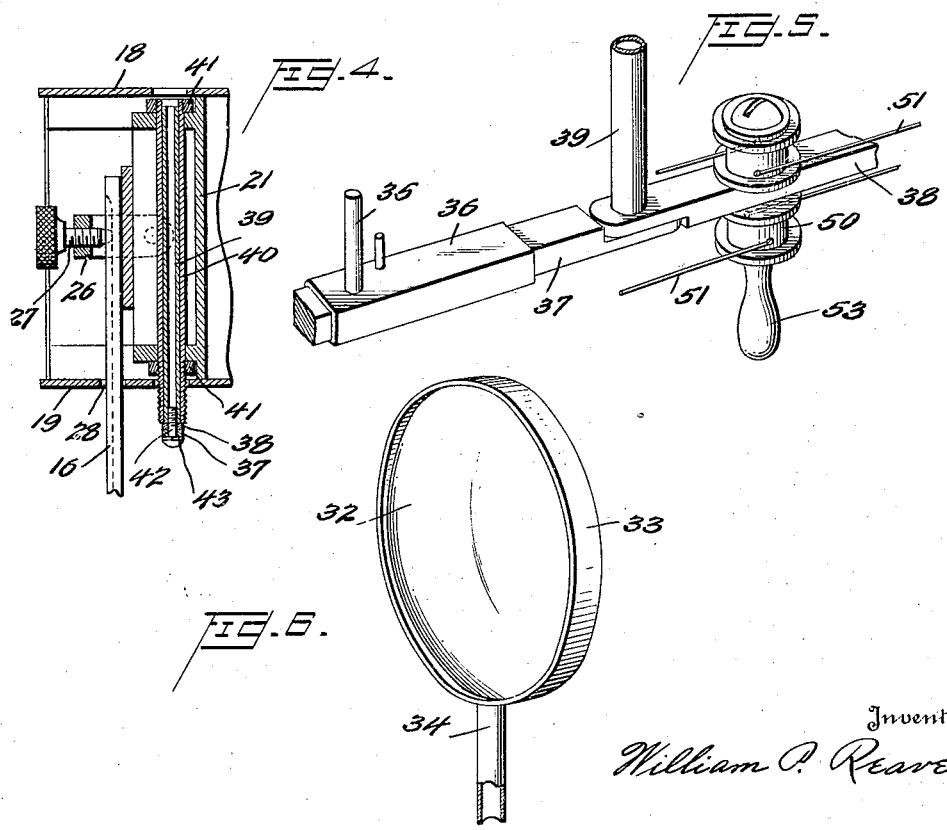
Inventor
William P. Reaves,
By Watson, Coit, Morse & Grindle
Attorney Patented Apr. 17, 1928.

1,666,145

UNITED STATES PATENT OFFICE.

WILLIAM P. REAVES, OF GREENSBORO, NORTH CAROLINA.

REFLECTING AND REFRACTING DEVICE FOR STEREOSCOPES.

Application filed August 29, 1923. Serial No. 659,983.

This invention relates to stereoscopic apparatus and particularly to reflecting and refracting devices employed in binocular observation of plates or objects in radiographic diagnosis.

In stereoscopic radiographic diagnosis two radiographs are placed exactly opposite each other in parallel planes on a stereoscope and inclined mirrors are positioned between them to reflect the light from the radiographs respectively into the respective eyes of the observer who sees the two pictures as one image, which image appears in relief.

In accordance with this invention, binocular lenses are employed in combination with the mirrors and these lenses enable the diagnostician to increase the acuteness of his vision by so placing the lenses that the radiograph is brought clearly into focus. Without such lenses it is often difficult or impossible for the diagnostician to bring the plates into exact focus, particularly when the diagnostician requires special glasses for certain distances. The stereoscopic lenses enable the observer to keep the radiograph at its proper distance from his eyes, which is the distance between the X-ray target and the X-ray plate when the radiograph is taken, and to focus and maintain the focus of the radiograph. Proper focusing may be done by merely adjusting the lenses and without moving the radiographs as has heretofore been found necessary.

Another advantage of the present invention resides in the magnifying effect of the lenses, the images of the two plates which, together, appear as one image, appearing larger so that the diagnostician observes greater detail than when magnification is not carried out.

Other features and objects of the invention will be apparent to one skilled in the art as it is disclosed in the accompanying drawings and in the following description. The present disclosure is, however, of one form of the invention only which is set forth by way of example and it will be obvious that changes in design and arrangement of the component parts may be made without departing from the spirit and scope of the invention.

In the drawings:

Figure 1 is a perspective view of a stereoscope showing the improved reflecting and refracting device incorporated therewith.

Fig. 2 is a longitudinal, vertical section through the reflecting and refracting device.

Fig. 3 is a horizontal section through the same.

Fig. 4 is a section on line 4—4 of Fig. 3.

Fig. 5 is a perspective view of portion of the device, and

Fig. 6 is a perspective view of one of the lenses.

A portion of the main frame of the stereoscope is indicated at 10, the plate-holding devices at 11, and one of the radiographic plates at 12. The member 10 comprises two parallel rods or trackways on which the frames 11 are slidably mounted and upon which the base 13 of the reflecting and refracting device is also slidably mounted. Base 13 includes parallel rods 14 upon which is mounted a slide 15, movable at right angles to the direction of movement of the base on the tracks 10, that is, toward or away from the observer. Extending upwardly from the slide 15 is a pedestal 16 and to the upper end of this pedestal is adjustably secured the frame 17 of the reflecting and refracting instrument.

The frame 17 includes top and bottom members 18 and 19 respectively, arranged in parallel planes and rigidly secured together. Corner posts are indicated at 20 and a main, central, U-shaped upright connecting post at 21. This frame, which has a box-like construction similar in general to that disclosed in my co-pending application, Serial Number 605,213, filed December 6, 1922, includes a nose-piece 22, and extending from this nose-piece rearwardly to the two corner posts 20 respectively are mirrors 23, preferably silvered upon their forward faces. These mirrors are protected by glass plates 24, 24 and 25, 25 in substantially the manner disclosed in my co-pending application, Serial Number 622,551, filed March 3, 1923.

A yoke 26, secured to post 21, extends around and slideably receives the post 16, and a thumb-screw 27 extends through a threaded aperture in the yoke and engages the vertical post. The frame may therefore be adjusted vertically, as found desirable by the diagnostician. The slot 28 in the bottom of the frame through which the post extends is elongated, as shown clearly in Fig. 3, so that the angular position of the frame relative to the post may be adjusted in a plane at right angles to the axis of the thumb-screw 27.

Dust-excluding protective doors are indicated at 30 and 31, 31, these doors being geared together for simultaneous operation in the manner disclosed in my application Serial Number 605,213, and being adapted to swing from the positions in which they are shown in full lines in Fig. 3 to dotted line position.

The lenses are indicated at 32 and are so supported on the frame that they may be laid flat against the protective glasses 24, 24 when the device is not being used, and covered by the folding shutters or doors 30. These lenses have circular frames or guards 33 to which are secured tubular members 34 into which project spindles 35 rigidly mounted upon sleeves 36. The tubes 34 are freely rotatable on spindles 35 and hence the lenses may be swung freely about these spindles as pivotal axes in the adjustment of the device in operation. Sleeves 36 are in turn slidably mounted upon arms 37 and 38. These arms are of substantially equal length and adapted to be swung about a common axis. Arm 38 is fixed to the lower end of a rod 39 which is received and frictionally held within a tube 40 extending vertically through the frame and secured therein by nuts 41. Arm 37 is secured to the lower end of rod 39 by means of a screw 42, there being a spring or friction washer 43 between the screwhead and arm 37. The construction is such that the rod 39 may be moved vertically within tube 40 but for all vertical adjustments of the rod the two arms 37 and 38 may swing about the same as an axis. Thus, in Fig. 3, two possible positions of arms 37 and 38 are indicated, in one of which the arms extend longitudinally of the stereoscope and in the other of which the arms are folded forwardly toward the observer or diagnostician. In the former position the lenses are adjusted to refract light rays passing from plates 12 to the mirrors, and in the latter position they are adjusted to refract light rays passing from the mirrors to the observer's eyes.

For moving the lenses simultaneously toward and away from the mirrors, I employ a cord and drum device comprising essentially a drum member or spool 50 rotatively mounted in arm 38, to which is attached the ends of a cord or wire 51. This wire is secured to each of the sleeves 36 and, due to the opposite winding around the drum 50, simultaneous movement of these sleeves, and hence of the lenses, will occur when the drum is rotated by means of the integral handle 53. The wire 51 passes over pulleys 54, 54 at the ends of the arms 37 and 38 respectively to insure free running.

In operating the reflecting and refracting device the diagnostician may either swing the lenses in front of the frame or may extend them laterally at its sides, as found preferable. The lenses may be rotated about their respective pivotal axes to secure the proper angular adjustment and may be moved longitudinally on the arms 37 and 38 to obtain the proper focus. In addition, the arms 37 and 38 may be swung about rod 39 to place them in the optical axes of the precise parts or portions of the radiograph being studied.

As pointed out, the frame 17 may also be vertically adjusted, tilted on the axis of thumb-screw 27, or moved forwardly or rearwardly on rods 14, so that all desirable adjustments of the apparatus may be conveniently and quickly made. When the apparatus is not being used, the lenses may be, as before pointed out, folded in against the sides of the frame and covered by the protective shutters or doors 30.

By the use of my improved apparatus, the acuteness of vision of the diagnostician may be increased, the lenses enabling him to bring the radiograph plates into exact focus even though the eyes of the particular diagnostician may in general be effective only at particular distances. The diagnostician is also enabled to keep the radiograph at its proper stereoscopic distance from his eye and to focus and maintain the focus of the radiograph. Proper focusing may be easily accomplished by moving the lenses and without moving the radiographs. In addition, the radiographs will be greatly magnified and the diagnosis thereby rendered more accurate.

It will be understood that the apparatus above described, that is, the lense mechanism including its supporting arms and adjusting device, may be formed as an integral part of the frame or may be formed as an attachment therefor. When formed as an attachment the device may be used with any well known stereoscopic mirror box device. The arms 37 and 38 may be either positioned below the frame or above the same, in whichever position may be found most convenient, the rod 39 being insertable into tube 40 from the top as well as from the bottom. To one skilled in the art it will also be apparent that many changes may be made in the design and arrangement of the component elements of the device and that it is not limited to that embodiment which has been disclosed by way of example.

Having thus described the invention what is claimed as new and desired to be secured by Letters Patent is:

1. In apparatus of the class described, in combination, two lenses, supporting means for the lenses whereby they are mounted for rotatory movement about parallel axes and swinging movement about a single axis, and means for attaching said supporting means to a mirror frame.

2. In apparatus of the class described, in combination, two lenses, supporting means for the lenses whereby they are mounted for rotatory movement about parallel axes and swinging movement about a single axis, and means for attaching said supporting means to a mirror frame, said attaching means permitting said supporting means to be adjusted relatively to the frame, for the purpose set forth.

In testimony whereof I hereunto affix my signature.

WILLIAM P. REAVES.